(12) United States Patent
Kim et al.

(10) Patent No.: US 8,194,390 B2
(45) Date of Patent: Jun. 5, 2012

(54) MULTILAYER CERAMIC CAPACITOR AND FABRICATING METHOD THEREOF

(75) Inventors: Hyo Jung Kim, Gyunggi-do (KR); Dong Ik Chang, Gyunggi-do (KR); Doo Young Kim, Gyunggi-do (KR); Ji Hun Jeong, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 93 days.

(21) Appl. No.: 12/843,280

(22) Filed: Jul. 26, 2010

(65) Prior Publication Data

US 2011/0157765 A1 Jun. 30, 2011

(30) Foreign Application Priority Data

Dec. 24, 2009 (KR) .................. 10-2009-0131172

(51) Int. Cl.
*H01G 4/06* (2006.01)
(52) U.S. Cl. ............... 361/321.2; 361/303; 361/311; 361/313; 361/321.1; 361/306.1
(58) Field of Classification Search .......... 361/303, 361/305, 308.1, 311–313, 306.1, 306.3, 321.1, 361/321.2, 301.2, 301.4
See application file for complete search history.

(56) References Cited

U.S. PATENT DOCUMENTS

| | | | | |
|---|---|---|---|---|
| 5,880,925 A | * | 3/1999 | DuPre et al. ................. | 361/303 |
| 6,128,177 A | * | 10/2000 | Titulaer et al. ............... | 361/305 |
| 6,292,353 B1 | * | 9/2001 | Haratani et al. ........... | 361/321.2 |
| 6,331,930 B1 | * | 12/2001 | Kuroda et al. .............. | 361/306.3 |
| 6,493,207 B2 | | 12/2002 | Nakano et al. | |
| 6,970,342 B1 | | 11/2005 | Togashi | |
| 7,436,650 B2 | * | 10/2008 | Oguni et al. ................ | 361/321.2 |
| 7,995,325 B2 | * | 8/2011 | Togashi ........................ | 361/303 |

FOREIGN PATENT DOCUMENTS

| | | |
|---|---|---|
| JP | 03-173108 A | 7/1991 |
| JP | 08-279435 | 10/1996 |
| JP | 09-129487 A | 5/1997 |
| JP | 11-297566 A | 10/1999 |
| JP | 2000-124057 A | 4/2000 |
| JP | 2003-127123 A | 5/2003 |
| JP | 2005-044903 A | 2/2005 |
| JP | 2005-136173 A | 5/2005 |
| JP | 2008-091400 | 4/2008 |
| JP | 2009-032833 | 2/2009 |
| JP | 2009-246102 A | 10/2009 |
| KR | 2001-0089761 | 10/2001 |
| KR | 10-2006-0046236 | 5/2006 |

OTHER PUBLICATIONS

Korean Office Action, with English translation, issued in Korean Patent Application No. 10-2009-0131172, mailed Apr. 21, 2011.
Japanese Office Action, w/ English translation thereof, Issued in Japanese Patent Application No. 2010-159675, dated Dec. 13, 2011.

* cited by examiner

*Primary Examiner* — Nguyen T Ha
(74) *Attorney, Agent, or Firm* — McDermott Will & Emery LLP

(57) ABSTRACT

A multilayer ceramic capacitor includes a capacitor body in which inner electrodes and dielectric layers are alternately laminated, and a length difference rate (D) of the inner electrodes is 7% or less. The length difference rate (D) is defined by $D=\{L-1\}/L \times 100$, where L is a maximum length of the inner electrode, and l is a minimum length of the inner electrode.

16 Claims, 6 Drawing Sheets

A-A'

MULTILAYER CERAMIC CAPACITOR AND FABRICATING METHOD THEREOF

CROSS-REFERENCE TO RELATED APPLICATIONS

This application claims the priority of Korean Patent Application No. 10-2009-0131172 filed on Dec. 24, 2009, in the Korean Intellectual Property Office, the disclosure of which is incorporated herein by reference.

BACKGROUND OF THE INVENTION

1. Field of the Invention

The present invention relates to a multilayer ceramic capacitor and a fabricating method thereof, and more particularly, to a multilayer ceramic capacitor, which is capable of providing the relationship between the length difference of inner electrodes, which is caused by a height difference of an effective layer during a compressing process, and the reliability of products, and a manufacturing method thereof.

2. Description of the Related Art

In general, multilayer ceramic capacitors include a plurality of ceramic dielectric sheets and inner electrodes interposed between the ceramic dielectric sheets. Multilayer ceramic capacitors are being widely used as capacitive parts in various electronic devices, due to their small size, high capacity and ease of mounting on a substrate.

Recently, as electronic products have become compact and multi-functional, chip components have also tended to become compact and highly functional. Following this trend, multilayer ceramic capacitors are required to be smaller but to have a higher capacitance than ever before.

Upon the design of products, in order to increase the capacity of products, capacitors are fabricated using a method of increasing an effective overlap area of an inner electrode contributing to a static capacitance or a method of increasing the number of layers by thinning a dielectric layer and an inner electrode layer. Accordingly, multilayer ceramic capacitors in which a dielectric layer is 1-2 µm thick, and more than 500 layers are laminated therein have recently been fabricated.

However, the increase in the number of laminations causes an increase in a cumulative height difference which forms a height difference by as much as a thickness of an inner electrode per a printed dielectric sheet. The cumulative height difference generates a recess due to material movement of the dielectric layer or protective cover part during a compressing process. Due to a density distribution caused by the difference of the recessed amount according to a position within the height difference region, an amount of elongation of the inner electrode layer or the dielectric layer is different, causing length variation and thickness nonuniformity.

Upon application of a voltage, shorting or IR characteristics are degraded by electric field concentration on a thin layer or a thin portion within the same layer, thus reducing the reliability of products.

SUMMARY OF THE INVENTION

An aspect of the present invention provides a multilayer ceramic capacitor, which is capable of providing the relationship between the length difference of inner electrodes, which is caused by a height difference of an effective layer during a compressing process, and the reliability of products, and a manufacturing method thereof.

Another aspect of the present invention provides the correlation between the length difference rate ($D=\{L-l\}/L \times 100$) defined below after a firing process and the reliability of products, while changing a content of an organic material, temperature and pressure of dielectric layers laminated on the top and bottom surfaces of a capacitor body, and a compressed member when a multilayer body in which dielectric layers printed with inner electrodes are laminated up to the target layers.

According to an aspect of the present invention, there is provided a multilayer ceramic capacitor including: a capacitor body in which inner electrodes and dielectric layers are alternately laminated, wherein a length difference rate (D) of the inner electrodes is 7% or less, the length difference rate (D) being defined by $D=\{L-l\}/L \times 100$, where L is a maximum length of the inner electrode, and l is a minimum length of the inner electrode.

The length difference rate (D) of the inner electrodes may be 5.3% or less when the thickness of the dielectric layer after the firing process is in the range of 0.65 µm to 1.20 µm.

The length difference rate (D) of the inner electrodes may be 6.0% or less when the thickness of the dielectric layer after the firing process is in the range of 1.30 µm to 2.50 µm.

The length difference rate (D) of the inner electrodes may be 6.8% or less when the thickness of the dielectric layer after the firing process is in the range of 3.0 µm to 4.0 µm.

The multilayer ceramic capacitor may further include outer electrodes electrically connected to the inner electrodes exposed in a laminated direction of the dielectric layers.

The number of laminated dielectric layers may be in the range of 10 to 1,000.

According to another aspect of the present invention, there is provided a method of fabricating a multilayer ceramic capacitor, including: forming a capacitor body by alternately laminating inner electrodes and dielectric layers; compressing the capacitor body; and firing the capacitor body, wherein a length difference rate (D) of the inner electrodes is 7% or less, the length difference rate (D) being defined by $D=\{L-l\}/L \times 100$, where L is a maximum length of the inner electrode, and l is a minimum length of the inner electrode.

The method may further include cutting the capacitor body to form individual capacitor bodies between the compressing process and the firing process.

The method may further include forming outer electrodes, which are electrically connected to the inner electrodes exposed in a laminated direction of the dielectric layers, between the compressing process and the firing process.

The length difference rate (D) of the inner electrodes may be 5.3% or less when the thickness of the dielectric layer after the firing process is in the range of 0.65 µm to 1.20 µm.

The length difference rate (D) of the inner electrodes may be 6.0% or less when the thickness of the dielectric layer after the firing process is in the range of 1.30 µm to 2.50 µm.

The length difference rate (D) of the inner electrodes may be 6.8% or less when the thickness of the dielectric layer after the firing process is in the range of 3.0 µm to 4.0 µm.

In the forming of the capacitor body, a content of an organic material forming the dielectric layers laminated on at least one of the upper and bottom surfaces of the capacitor body may be increased by 10-30% with respect to the dielectric layer in order to increase a recess amount of a height difference portion during a compressing process.

In the compressing of the capacitor body, a flexible member may be applied on any one of the top and bottom surfaces of the capacitor body, and may be subjected to an isostatic press.

The capacitor body may be compressed at room temperature to 100° C. at a pressure of 500 kgf/cm2 to 1,500 kgf/cm2.

The capacitor body may be cut by at least one of a cutting method using a blade containing tungsten-carbide (W—C) and a wheel cutting method.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
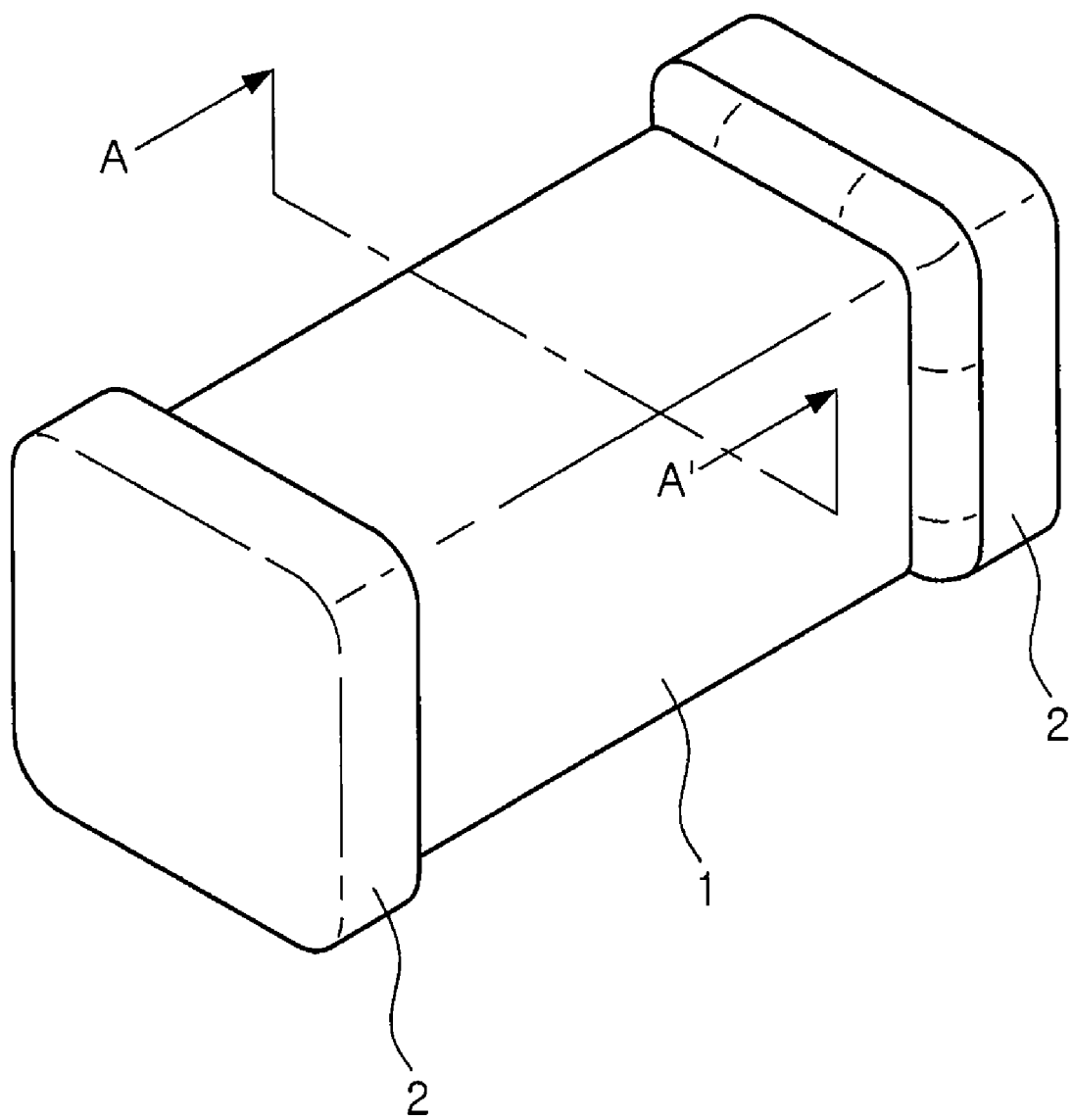
FIG. 1 is a perspective view schematically illustrating a multilayer ceramic capacitor according to an embodiment of the present invention.

Hereinafter, exemplary embodiments of the present invention will be described with reference to the accompanying drawings to fully explain the present invention in such a manner that it may easily be carried out by a person with ordinary skill in the art to which the present invention pertains. In the detailed description of exemplary embodiments of the present invention below, detailed descriptions related to well-known functions or configurations will be left out in order not to unnecessarily obscure subject matters of the present invention.

Throughout the drawings, like reference numerals denote like elements having the same construction and function.

In this disclosure below, when one part is referred to as being 'connected' to another part, it should be understood that the former can be 'directly connected' to the latter, or 'electrically connected' to the latter via an intervening part. Furthermore, when it is described that one comprises (or includes or has) some elements, it should be understood that it may comprise (or include or has) only those elements, or it may comprise (or include or have) other elements as well as those elements if there is no specific limitation.

Herebelow, a multilayer ceramic capacitor and a manufacturing method thereof according to an embodiment of the present invention will be described with reference to FIGS. 1 to 7.

FIG. 1 is a perspective view schematically illustrating a multilayer ceramic capacitor according to an embodiment of the present invention. Referring to FIG. 1, a multilayer ceramic capacitor according to an embodiment of the present invention may include a capacitor body 1 and outer electrode 2.

Figure 2A:
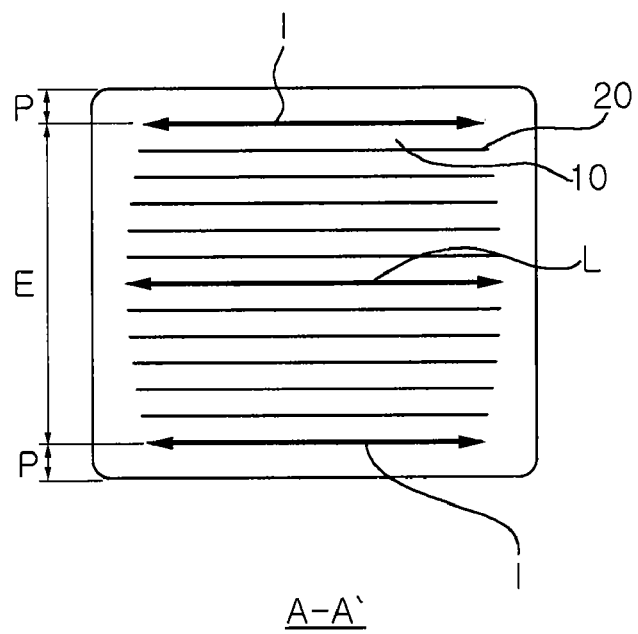
FIGS. 2A to 2C are cross-sectional views taken along line A-A' of FIG. 1.
Figure 2B:
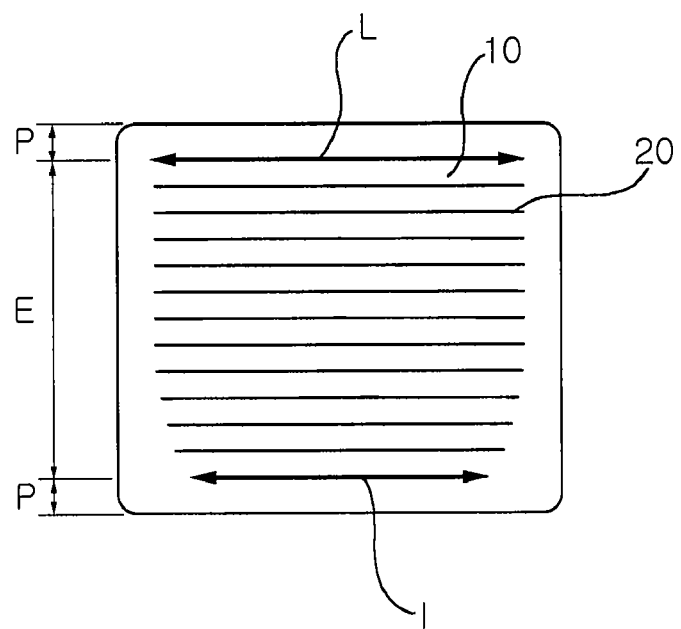
Figure 2C:
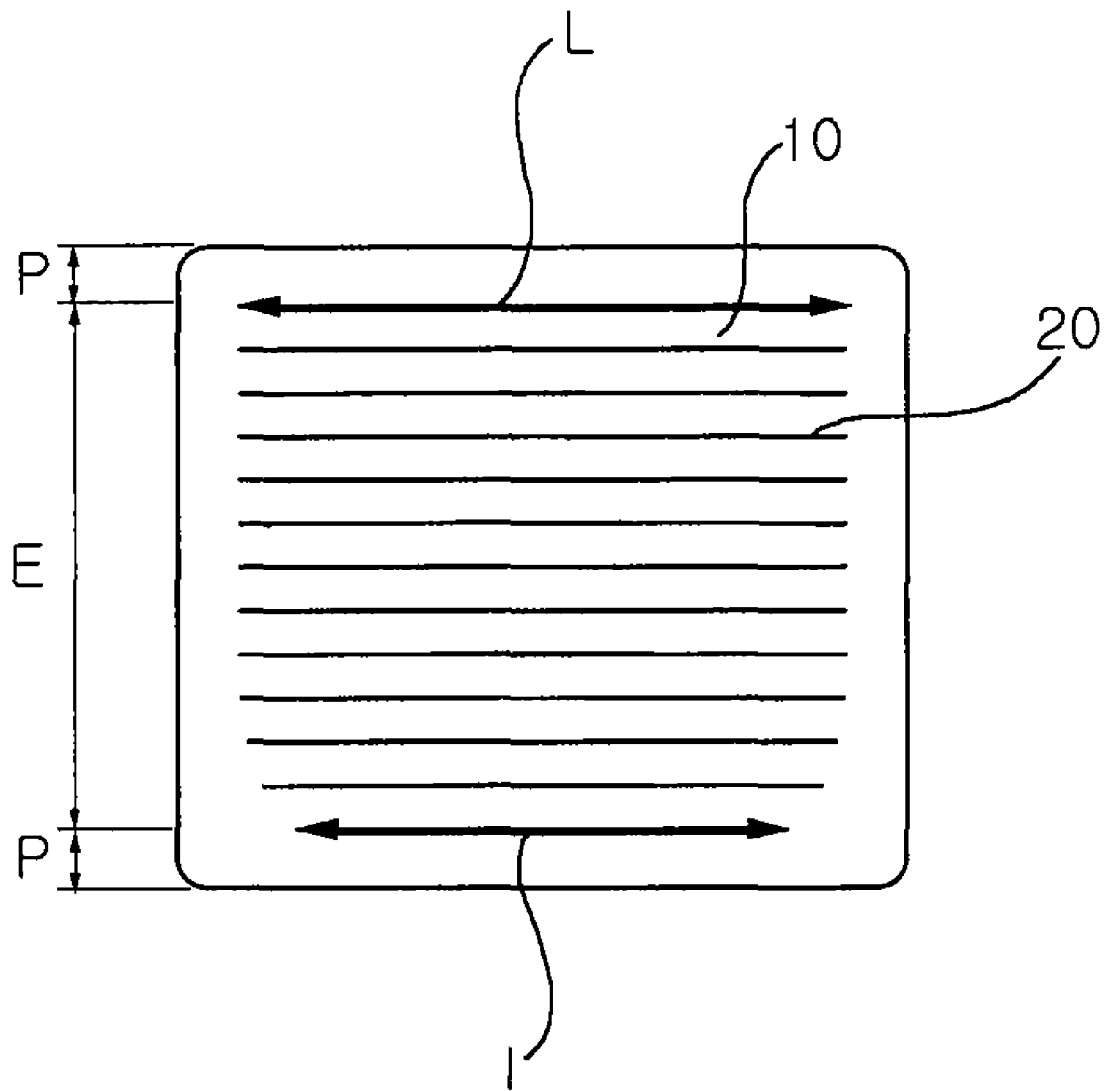

FIGS. 2A to 2C are cross-sectional views taken along line A-A' of FIG. 1. Referring to FIGS. 2A to 2C, a plurality of dielectric layers 10 may be laminated within the capacitor body 1, and inner electrodes 20 may be inserted between the dielectric layers 10. The dielectric layers 10 may be formed of barium titanate ($Ba_2TiO_3$), and the inner electrodes 20 may be formed of nickel (Ni), tungsten (W), or cobalt (Co).

The outer electrodes 2 may be formed at both sides of the capacitor body 1. The outer electrodes 2 may serve as external terminals because they are formed to be electrically connected to the inner electrodes 20 exposed to the outer surface of the capacitor body 1. The outer electrodes 2 may be formed of a mixture of copper (Cu) and other metals, and glass.

Figure 3A:
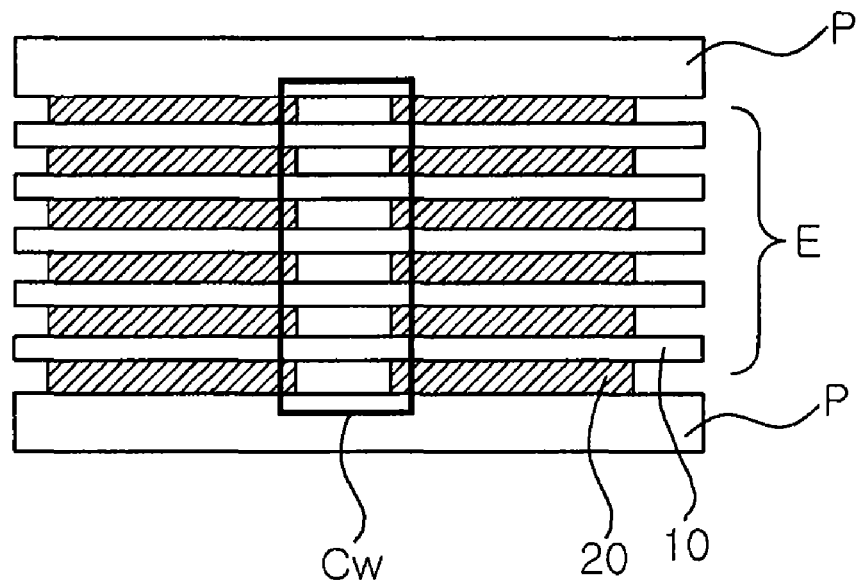
FIGS. 3A and 3B are a longitudinal sectional view and a cross-sectional view schematically illustrating a typical multilayer ceramic capacitor in which a cumulative height difference occurs between dielectric layers
Figure 3B:
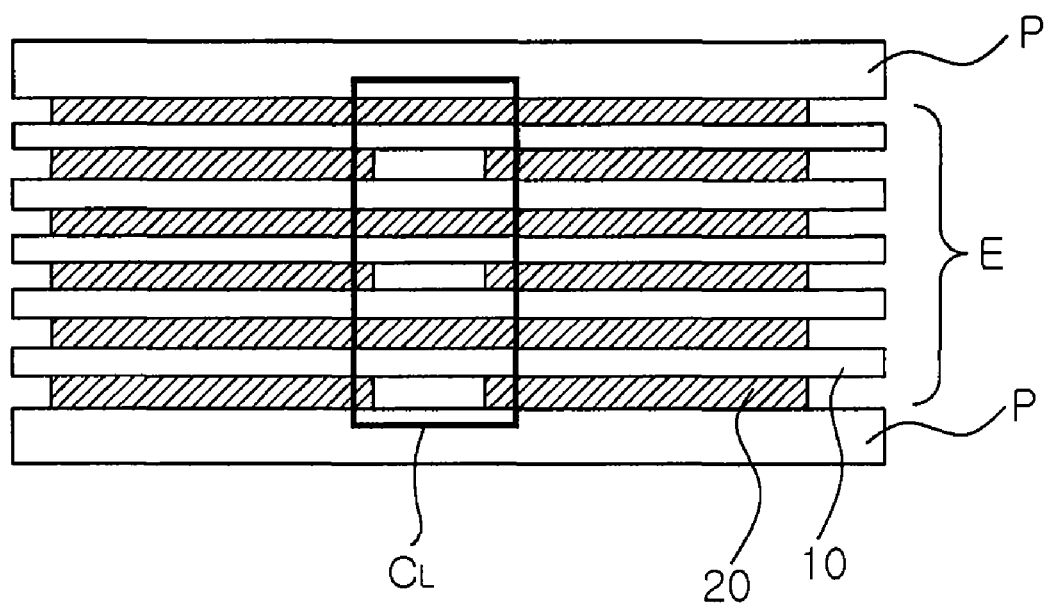

FIGS. 3A and 3B are a longitudinal sectional view and a cross-sectional view schematically illustrating a typical multilayer ceramic capacitor in which a cumulative height difference occurs between dielectric layers. Referring to FIGS. 3A and 3B, the capacitor body 1 according to the embodiment of the present invention may include an effective layer E in which the dielectric layers 10 and the inner electrodes 20 are alternately laminated.

The effective layer E is a region in which the dielectric layer 10 and the inner electrode 20 are overlapped to implement a static capacitance. The effective layer E may be divided into a W cut-away section of FIG. 3A and an L cut-away section of FIG. 3B according to a cut direction. In the case of the L cut-away section, a height difference (C) occurs in a three-layer structure in which the inner electrode 10 is interposed between two dielectric layers 20, resulting in a cumulative height difference ($C_L$). In the case of the W cut-away section, a height difference (C) occurs between two dielectric layers 20, resulting in a cumulative height difference ($C_w$). Accordingly, since the L cut-away section has a relatively higher density than the W cut-away section, the deformation of the effective layer E less occurs during a compressing process. Hereinafter, the following description will be focused on the cumulative height difference ($C_w$) of the W cut-away section in which the deformation of the effective layer E greatly occurs.

As described above, in the capacitor body 1, the cumulative height difference ($C_w$) may occur between the inner electrodes 20 adjacent in a horizontal direction during a compressing process, and the applied pressure may be differently transferred according to a position within the capacitor body 1. Therefore, after the compressing process, the cumulative height difference ($C_w$) is decreased sharply so that the length difference of the inner electrodes 10 occurs. For example, the cumulative height difference portion may have a pot shape as depicted in FIG. 2A, an inverted trapezoidal shape as depicted in FIG. 2B, or a shape as depicted in FIG. 2C in which the upper portion and the lower portion have the same inverted trapezoidal shape. When the maximum and minimum lengths of the inner electrodes 20 are defined as "L" and "l", respectively, the length difference rate (D) of the inner electrodes 20 may be calculated using Equation (1) below.

$$D=\{L-l\}/L\times100 \qquad (1)$$

In addition, the multilayer ceramic capacitor may include a passivation layer P which is formed by laminating dielectric layers on the top and bottom surfaces of the effective layer E. Since the passivation layer P is formed by sequentially laminating a plurality of dielectric layers on the top and bottom surfaces of the effective layer E, the effective layer E may be protected from external impacts or the like.

As for the thickness differences among the dielectric layers disposed in different locations within the capacitor body 1 after the firing, in the upper portion A and the lower portion C, the recess amount of the cumulative height difference during the compressing process is large and the density is high, therefore, as compared with the middle portion B, the elongation amount of the dielectric layer 10 and the inner electrode 20 is small and thus the thickness is large and uniform. On the other hand, the density of the middle portion B is lower than the density of the portions A and B. Thus, the elongation amount increases, and a thin and nonuniform layer is formed.

COMPARATIVE EXAMPLE 1

Figure 4A:
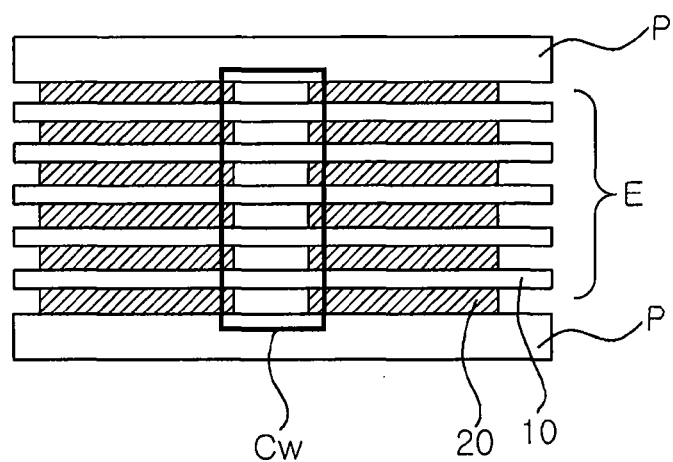
FIGS. 4A to 4C are cross-sectional views schematically illustrating a method for fabricating a multilayer ceramic capacitor according to an embodiment of the present invention.
Figure 4B:
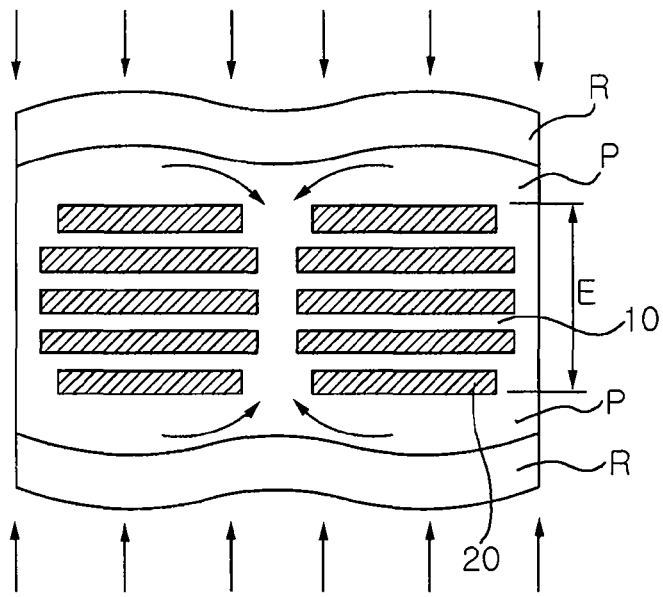
Figure 4C:
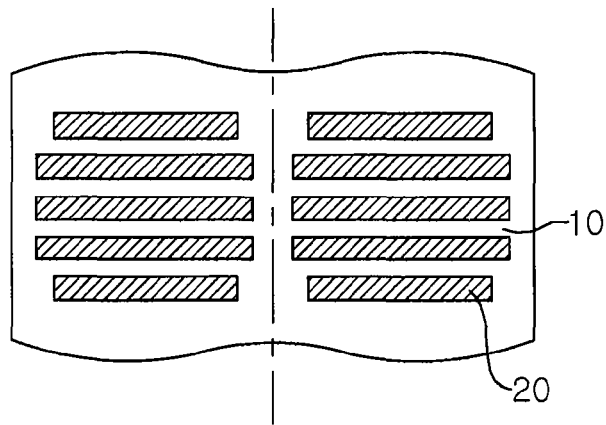

FIG. 4A is a cross-sectional view schematically illustrating a method for fabricating a multilayer ceramic capacitor according to an embodiment of the present invention. Referring to FIG. 4A, dielectric layers 10 of a capacitor body 1 were formed to include 11 wt % of a binder, 20 wt % of a plasticizer, and a balance of a dielectric material having a grain size of 0.1-0.40 μm. Conductive inner electrodes 20 were printed on the dielectric layers 10 obtained by molding a slurry having the above-described composition. Then, a multilayer body with a predetermined thickness was made out of the printed dielectric layers 10, and a passivation layer P having the same organic composition as the dielectric layers 10 was applied thereto. As illustrated in FIG. 4B, the resultant structure was then compressed at a predetermined temperature. As illustrated in FIG. 4C, a cutting process and a firing process were performed. Then, outer electrodes 2 were attached and a plating process was performed thereon, thereby completing the fabrication of the multilayer ceramic capacitor.

Embodiment 1

FIG. 4A is a cross-sectional view schematically illustrating a method for fabricating a multilayer ceramic capacitor according to an embodiment of the present invention. Referring to FIG. 4A, dielectric layers 10 of a capacitor body 1 were formed to include 11 wt % of a binder, 20 wt % of a plasticizer, and a balance of a dielectric material having a grain size of 0.1-0.40 μm. Conductive inner electrodes 20 were printed on the dielectric layers 10 obtained by molding a slurry having the above-described composition. Then, a multilayer body with a predetermined thickness was made out of the printed dielectric layers 10. Then, as illustrated in FIG. 4B, a flexible member R, such as polyurethane or silicon rubber, was applied on the top and bottom surfaces of a passivation layer. The resultant structure was cut along the cutting line of FIG. 4C. Then, a firing process, an outer electrode attaching process, and a plating process were performed, thereby completing the fabrication of the multilayer ceramic capacitor.

Embodiment 2

FIG. 4A is a cross-sectional view schematically illustrating a method for fabricating a multilayer ceramic capacitor according to an embodiment of the present invention. Referring to FIG. 4A, dielectric layers 10 of a capacitor body 1 were formed to include 11 wt % of a binder, 20 wt % of a plasticizer, and a balance of a dielectric material having a grain size of 0.1-0.40 μm. Conductive inner electrodes 20 were printed on the dielectric layers 10 obtained by molding a slurry having the above-described composition. Then, a multilayer body with a predetermined thickness was made out of the printed dielectric layers 10, and an organic composition of a passivation layer P was modified to include 13 wt % of a binder and 30 wt % of a plasticizer. As illustrated in FIG. 4B, the resultant structure was then compressed at a predetermined temperature. The resultant structure was cut along the cutting line of FIG. 4C. Then, a firing process, an outer electrode attaching process, and a plating process were performed, thereby completing the fabrication of the multilayer ceramic capacitor.

TABLE 1

| Comparative example | D (%) | Average thickness of dielectric layer after firing | | | SC (μF) | SOF (/100EA) | IRDOF (/100EA) |
|---|---|---|---|---|---|---|---|
| | | UP | CP | LP | | | |
| 1 | 6.2 | 0.89 | 0.97 | 1.15 | 4.83 | 7/100 | 4/100 | where,
D is the length difference rate of the inner electrode after the firing process,
UP is the upper portion of the dielectric layer
CP is the center portion of the dielectric layer,
LP is the lower portion of the dielectric layer,
SC is static capacitance,
SOF is shorting occurrence frequency, and
IRDOF is IR degradation occurrence frequency.

TABLE 2

| Embodiment | D (%) | Average thickness of dielectric layer after firing | | | SC (μF) | SOF (/100EA) | IRDOF (/100EA) |
|---|---|---|---|---|---|---|---|
| | | UP | CP | LP | | | |
| 1 | 4.3 | 1.12 | 1.08 | 1.13 | 4.71 | 0/100 | 0/100 |
| 2 | 4.9 | 1.08 | 1.06 | 1.11 | 4.75 | 0/100 | 0/100 | where,
D is the length difference rate of the inner electrode after the firing process,
UP is the upper portion of the dielectric layer
CP is the center portion of the dielectric layer,
LP is the lower portion of the dielectric layer,
SC is static capacitance,
SOF is shorting occurrence frequency, and
IRDOF is IR degradation occurrence frequency.

Table 1 for the comparative example 1 shows a typical compressing process for the purpose of comparison with the results obtained from Table 2 for the embodiments 1 and 2. The evaluation of the product was measured with the length difference rate (D) and the thickness of the inner electrodes 20 at different positions of the dielectric layer 10 after the firing process, which were obtained according to the organic composition modification of the member and the passivation layer P during the compressing process. Also, the static capacitance, the shorting occurrence frequency, and the IR degradation occurrence frequency at a high temperature load experimentation were measured with respect to the plated multilayer ceramic capacitor.

The IR degradation occurrence frequency is a high temperature acceleration life, which is one of various evaluation methods for ensuring 1,000-hour life in an actual use environment. For example, the evaluation is performed for a predetermined time with the rated voltage of 1.0-2.0 Vr at the rated test temperature, and the number of samples which do not meet the IR specification is measured.

Embodiments 3, 4 and 5

FIG. 4A is a cross-sectional view schematically illustrating a method for fabricating a multilayer ceramic capacitor according to an embodiment of the present invention. Referring to FIG. 4A, dielectric layers 10 of a capacitor body 1 were formed to include 11 wt % of a binder, 20 wt % of a plasticizer, and a balance of a dielectric material having a grain size of 0.1-0.40 µm. Conductive inner electrodes 20 were printed on the dielectric layers 10 obtained by molding a slurry having the above-described composition. Then, a multilayer body with a predetermined thickness was made out of the printed dielectric layers 10, and a compressing process was performed at a modified compressing temperature and in a modified boosting profile. Then, a cutting process, a firing process, and an outer electrode attaching process, and a plating process were performed, thereby completing the fabrication of the multilayer ceramic capacitor.

TABLE 3

| Embodiment | Thickness of dielectric layer after firing (µm) | Length difference rate of inner electrode after firing (%) |
|---|---|---|
| 3 | 0.65-1.20 | 5.3 or less |
| 4 | 1.30-2.50 | 6.0 or less |
| 5 | 3.00-4.00 | 6.8 or less |

Figure 5:
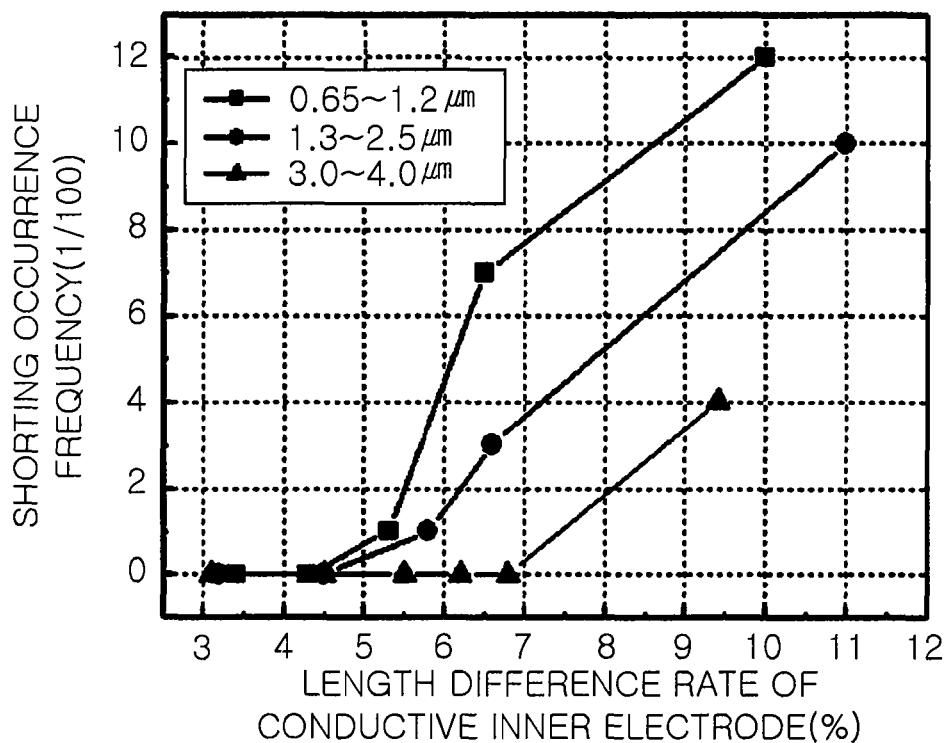
FIG. 5 is a graph showing the relationship between the length of the inner electrode and the shorting occurrence frequency according to the thickness of the dielectric layer at each position.
Figure 6:
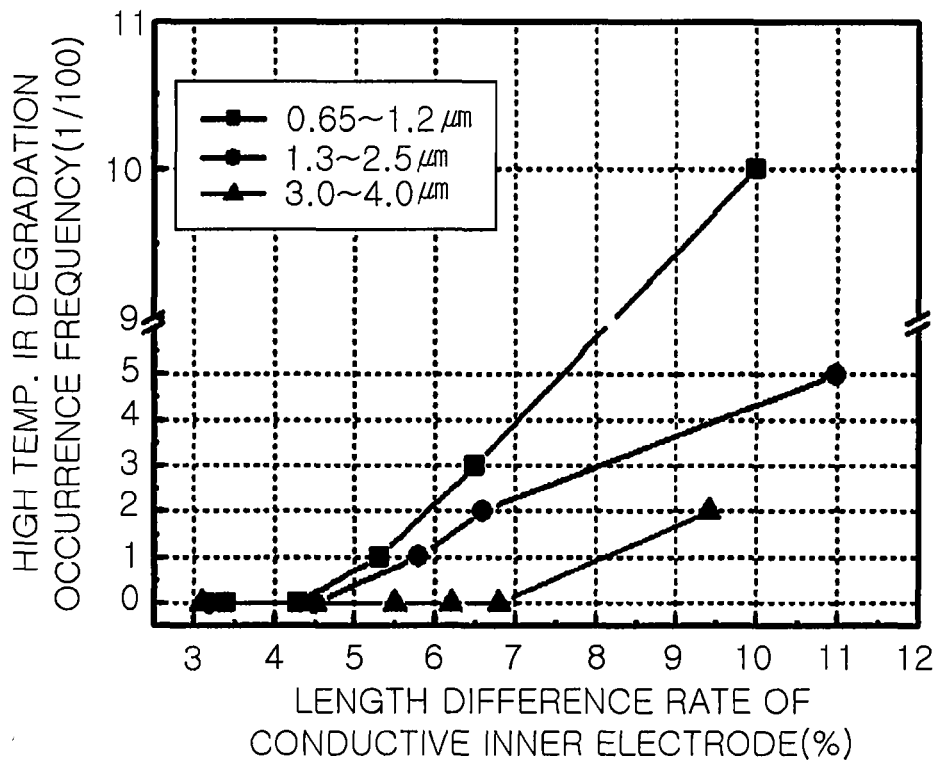
FIG. 6 is a graph showing the relationship between the length difference rate of the inner electrode and the IR degradation occurrence frequency according to the thickness of the dielectric layer at each position.

Table 3 summarizes the mutual relationship between the thickness of the dielectric layer and the length difference rate (D) of the inner electrode affecting the reliability of the product, which were obtained by evaluating the length difference rate (D) of the inner electrode 20, the shorting occurrence frequency, and the IR degradation occurrence frequency in the high temperature load test, at each thickness of the dielectric layer 10 after the firing process under the compressing condition, which have been described with reference to FIGS. 5 and 6.

As can be seen from Table 3, the length difference rate (D) of the inner electrode is 5.3% or less when the thickness of the dielectric layer 10 is in the range of 0.65 µm to 1.20 µm; the length difference rate (D) of the inner electrode is 6.0% or less when the thickness of the dielectric layer 10 is in the range of 1.30 µm to 2.50 µm; and the length difference rate (D) of the inner electrode is 6.8% or less when the thickness of the dielectric layer 10 is in the range of 3.0 µm to 4.0 µm Referring to Tables 1 to 3 and FIGS. 5 and 6, the length difference rate (D) of the inner electrode after the firing process during the compressing process can be controlled through the embodiment 1 in which the flexible member was applied during the compressing process, the embodiment 2 in which the organic composition of the passivation layer P was modified, and the embodiments 3 to 5 in which the compressing temperature or the boosting profile was modified during the compressing process.

However, the organic powder and the metal size of the inner electrode 20 must be reduced in order for thinning the dielectric layer 10 and the inner electrode 20 which is generally performed for ensuring the capacitance of the multilayer capacitor according to the above-described miniaturization. Due to the increase of the specific surface area according to the reduced metal size, the member, the compressing temperature and profile during the compressing process may be diversified. Thus, it is actually difficult to ascertain the compressing method affecting the reliability. Therefore, in order to evaluate the reliability, it is reasonable to manage the multilayer ceramic capacitor using the length difference rate (D) of the inner electrode with respect to the thickness of the dielectric layer 10 after the firing process.

As described above, according to the embodiments of the present invention, it is possible to provide the relationship between the length difference of inner electrodes, which is caused by a height difference of an effective layer during a compressing process, and the reliability of products. Also, it is possible to know the correlation between the reliability of the multilayer ceramic capacitor and the length difference ratio of the inner electrode after the firing process. In addition, it is possible to suggest the suitable range for the length difference rate of the inner electrode affecting the reliability of the multilayer ceramic capacitor by using the thickness of the dielectric layer after the firing process as parameters.

While the present invention has been shown and described in connection with the exemplary embodiments, it will be apparent to those skilled in the art that modifications and variations can be made without departing from the spirit and scope of the invention as defined by the appended claims.

What is claimed is:

1. A multilayer ceramic capacitor comprising:
a capacitor body in which inner electrodes and dielectric layers are alternately laminated,
wherein a length difference rate (D) of the inner electrodes is 7% or less, the length difference rate (D) being defined by $D=\{L-l\}/L \times 100$, where L is a maximum length of the inner electrode, and l is a minimum length of the inner electrode.

2. The multilayer ceramic capacitor of claim 1, wherein the length difference rate (D) of the inner electrodes is 5.3% or less when the thickness of the dielectric layer after the firing process is in the range of 0.65 µm to 1.20 µm.

3. The multilayer ceramic capacitor of claim 1, wherein the length difference rate (D) of the inner electrodes is 6.0% or less when the thickness of the dielectric layer after the firing process is in the range of 1.30 µm to 2.50 µm.

4. The multilayer ceramic capacitor of claim 1, wherein the length difference rate (D) of the inner electrodes is 6.8% or less when the thickness of the dielectric layer after the firing process is in the range of 3.0 µm to 4.0 µm.

5. The multilayer ceramic capacitor of claim 1, further comprising outer electrodes electrically connected to the inner electrodes exposed in a laminated direction of the dielectric layers.

6. The multilayer ceramic capacitor of claim 1, wherein the number of laminated dielectric layers is in the range of 10 to 1,000.

7. A method of fabricating a multilayer ceramic capacitor, the method comprising:
forming a capacitor body by alternately laminating inner electrodes and dielectric layers;
compressing the capacitor body; and
firing the capacitor body,
wherein a length difference rate (D) of the inner electrodes is 7% or less, the length difference rate (D) being defined by $D=\{L-l\}/L \times 100$, where L is a maximum length of the inner electrode, and l is a minimum length of the inner electrode.

8. The method of claim 7, further comprising cutting the capacitor body to form individual capacitor bodies between the compressing process and the firing process.

9. The method of claim 8, wherein the capacitor body is cut by at least one of a cutting method using a blade containing tungsten-carbide (W—C) and a wheel cutting method.

10. The method of claim 7, further comprising forming outer electrodes, which are electrically connected to the inner electrodes exposed in a laminated direction of the dielectric layers, between the compressing process and the firing process.

11. The method of claim 7, wherein the length difference rate (D) of the inner electrodes is 5.3% or less when the thickness of the dielectric layer after the firing process is in the range of 0.65 μm to 1.20 μm.

12. The method of claim 7, wherein the length difference rate (D) of the inner electrodes is 6.0% or less when the thickness of the dielectric layer after the firing process is in the range of 1.30 μm to 2.50 μm.

13. The method of claim 7, wherein the length difference rate (D) of the inner electrodes is 6.8% or less when the thickness of the dielectric layer after the firing process is in the range of 3.0 μm to 4.0 μm.

14. The method of claim 7, wherein, in the forming of the capacitor body, a content of an organic material forming the dielectric layers laminated on at least one of the upper and bottom surfaces of the capacitor body is increased by 10-30% with respect to the dielectric layer in order to increase a recess amount of a height difference portion during a compressing process.

15. The method of claim 7, wherein, in the compressing of the capacitor body, a flexible member is applied on any one of the top and bottom surfaces of the capacitor body, and is subjected to an isostatic press.

16. The method of claim 7, wherein the capacitor body is compressed at room temperature to 100° C. at a pressure of 500 kgf/cm$^2$ to 1,500 kgf/cm$^2$.

* * * * *